US011371489B2

(12) United States Patent
Eidam et al.

(10) Patent No.: US 11,371,489 B2
(45) Date of Patent: Jun. 28, 2022

(54) TOWER FOR A WIND TURBINE WITH IMPROVED CABLE SUPPORT IN A VERTICAL AND HORIZONTAL ARRANGEMENT

(71) Applicant: General Electric Renovables Espana, S.L., Barcelona (ES)

(72) Inventors: Mathias Eidam, Salzbergen (DE); Stefan Voss, Salzbergen (DE); Holger Luehn, Salzbergen (DE); Daniel Ross, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 16/953,741

(22) Filed: Nov. 20, 2020

(65) Prior Publication Data

US 2021/0156365 A1 May 27, 2021

(30) Foreign Application Priority Data

Nov. 21, 2019 (EP) ..................................... 19210730

(51) Int. Cl.
*F03D 80/80* (2016.01)
*F03D 9/25* (2016.01)
*F03D 13/20* (2016.01)

(52) U.S. Cl.
CPC ............... *F03D 80/85* (2016.05); *F03D 9/25* (2016.05); *F03D 13/20* (2016.05);
(Continued)

(58) Field of Classification Search
None
See application file for complete search history.

(56) References Cited

U.S. PATENT DOCUMENTS 8,274,170 B2 * 9/2012 Kassner .................. F03D 80/00
290/55
2009/0206610 A1 * 8/2009 Martin .................... F03D 80/82
290/55
(Continued)

FOREIGN PATENT DOCUMENTS

WO WO 2016/206690 A1 12/2016

OTHER PUBLICATIONS

EPO Search Report, dated May 28, 2020.

*Primary Examiner* — Tulsidas C Patel
*Assistant Examiner* — S. Mikailoff
(74) *Attorney, Agent, or Firm* — Dority & Manning, P.A.

(57) ABSTRACT

A tower for a wind turbine is disclosed, said wind turbine comprises the tower, a nacelle and a rotor having at least one rotor blade. The tower is configured for supporting the nacelle and the rotor on a support system. The tower itself may be structured as having an upper top end for supporting the nacelle and a lower support end for being placed on the support system. Electric energy generated is transported via power cables from the nacelle to an electric grid, preferably via power electronic components, switches and/or transformers. Furthermore, the nacelle may rotate around the yaw axis according to the current wind direction. Hence, the rotation of the nacelle introduces a twist into the power cables, wherein said twist causes a deviation (shortening) in the length of the power cables. Furthermore, the tower comprises at least one radial cable guiding device for receiving the cable and a cable support arrangement for supporting the cable in a beneficial manner. Additionally, the tower comprises anti-torsion fixation means configured for reducing and/or preventing a propagation of a cable twist of the cables of a hanging portion into power cables of a loop portion. The power cables comprise a hanging portion having a cable axis, a cable loop portion having a horizontal
(Continued)

cable loop, and the supported portion being at least partially supported by the cable support arrangement.

12 Claims, 5 Drawing Sheets

(52) U.S. Cl.
CPC ..... *F05B 2220/706* (2013.01); *F05B 2240/85* (2020.08); *F05B 2260/30* (2013.01)

(56) References Cited

U.S. PATENT DOCUMENTS

| | | | | |
|---|---|---|---|---|
| 2009/0284012 | A1* | 11/2009 | Mortensen | F03D 13/20 |
| | | | | 290/44 |
| 2013/0068496 | A1* | 3/2013 | Domesle | F03D 80/00 |
| | | | | 174/100 |
| 2013/0105199 | A1 | 5/2013 | Domesle et al. | |
| 2017/0097110 | A1* | 4/2017 | Hamsho | F03D 9/255 |

\* cited by examiner

TOWER FOR A WIND TURBINE WITH IMPROVED CABLE SUPPORT IN A VERTICAL AND HORIZONTAL ARRANGEMENT

FIELD

The present subject matter generally relates to towers for wind turbines, and more particularly to an arrangement of a nacelle of the wind turbine on a tower, wherein power cables are provided from the nacelle on top of the tower to a lower part of the tower.

BACKGROUND

Wind power is considered one of the cleanest, most environmentally friendly energy sources presently available, and wind turbines have gained increased attention in this regard. A modern wind turbine possibly includes a tower, a generator, a gearbox, a nacelle, and one or more rotor blades.

In EP 2 577 058 B1 a tower for a wind turbine and a cable guiding for a tower of a wind turbine is provided. Within the tower power cables lead from the nacelle to the ground. A cable guiding system is installed for optimizing an overall capacity of the power and to reduce wear between the cables. The object is achieved by using at least two bundling devices.

It is an object to provide a tower for a wind turbine having cables being guided from the nacelle to a lower portion of the tower, wherein disadvantages of the prior art, for example increased wear and/or complexity of related devices and/or arrangements are avoided or an effect thereof is reduced.

BRIEF DESCRIPTION

Aspects and advantages of the disclosure will be set forth in part in the following description, or may be obvious from the description, or may be learned through practice of the disclosure.

In one aspect, the present disclosure is directed to a tower for a wind turbine as described herein and to a wind turbine as described herein. Specific embodiments are set forth in the independent and described claims.

In particular, or in the alternative, a tower for a wind turbine is disclosed. Said wind turbine comprises a tower, a nacelle and a rotor having at least one rotor blade. The rotor is rotatably supported by the nacelle such that the rotor can rotate around an at least partially horizontal rotor axis.

The tower is configured for supporting the nacelle and the rotor on a support system, preferably on a support system being arranged on a ground. The tower itself may be structured as having an upper top end for supporting the nacelle and a lower support end for being placed on the support system.

It shall be noted, that any indication with regard to positioning, specific locations and/or arrangements of the wind turbine, of the tower and/or of parts of the tower shall be understood with respect to an erected and/or operational wind turbine and its tower.

Furthermore, specific directions and orientations such as longitudinal, axial, radial, circumferential, inner and/or outer refer to the geometric structure of the tower. For example, the longitudinal axis or centerline of the tower has a more inner position than tower walls which have an outer position when seen in a radial direction.

The tower may comprise an electrical connection arrangement mounted directly or indirectly to the tower at a lower level than the top end. Additionally or in the alternative, the electrical connection arrangement can be placed on the ground, either in the tower or in the vicinity of the tower. The electrical connection arrangement is configured to receive lower cable endings of the power cables reaching from the nacelle through the tower such, that the power cables can be connected to the electrical connection arrangement.

Within the nacelle at least an electrical power component, for example an electric generator, is arranged, wherein the rotor, for example a rotor shaft, is supported by the nacelle such, that the generator can be rotated by a rotation of the rotor. The rotor blades capture kinetic energy from wind using known foil principles and transmit the kinetic energy through rotational energy to turn a shaft and thereby coupling the rotor blades via a gearbox to an electrical generator, or if a gearbox is not used, directly to the generator. By this, kinetic energy of the wind harvested by the rotor blades is transformed into mechanical, rotational energy, and is further transformed into electrical energy by the generator. Subsequently, electric energy generated is transported via power cables from the nacelle to an electric grid, preferably via power electronic components, switches and/or transformers.

According to an embodiment, power electronic components, switches and/or transformers can be provided within the nacelle such and connected to the generator such, that the electrical energy as generated by the generator having a low voltage of 400 V to 1000 V is transformed to a medium voltage—for example having a voltage of around 10 kV or between 20-35 kV—, directly in the nacelle by said components. In this case, at least two, preferably three, cables having a sufficiently large cross-section are used for transporting electrical energy from the nacelle through the tower to an electrical connection point, for example to the electric connection arrangement.

In particular, a transformation into medium voltage directly in the tower may be implemented, if the overall rated power of the wind turbine exceeds 4.6 MW, preferably exceeds 4.8 MW.

A power cable according to the present disclosure is a conducting device configured for transmitting one type of electrical current, in particular having a single phase. In particular, a multi-core cable having a plurality of power conductors configured for transmitting a plurality of electrical currents, in particular each having a different electrical phase, shall be considered as a plurality of power cables.

According to an embodiment the number of power cables can be more than three, preferably a multiplicity of three.

For example, a cable ($MV_{high}$-cable, 20-35 kV) for the higher middle voltage power transmission made of copper may have a cross section of at least 55 mm$^2$, preferably at least 60 mm$^2$, further preferred at least 65 mm$^2$, and/or of around 70 mm$^2$, and/or may have a cross section not larger than 75 mm$^2$, in particular preferably not larger than 80 mm$^2$.

A cable ($MV_{high}$-cable, 20-35 kV) for the higher middle voltage power transmission made of aluminum may have a cross section of at least 85 mm$^2$, preferably at least 90 mm$^2$, and/or of around 95 mm$^2$, and/or may have a cross section not larger than 110 mm$^2$, in particular not larger than 100 mm$^2$, preferably not larger than 95 mm$^2$.

A cable ($MV_{low}$-cable, ca. 10 kV) for the lower middle voltage power transmission made of copper may have a cross section of at least 150 mm$^2$, in particular at least 170 mm$^2$, preferably at least 180 mm$^2$, and/or of around 185 mm², and/or may have a cross section not larger than 230 mm², preferably not larger than 210 mm², further preferred not larger than 190 mm².

A cable ($MV_{low}$-cable, ca. 10 kV) for the lower middle voltage power transmission made of aluminum may have a cross section of at least 200 mm², in particular at least 220 mm², preferably at least 230 mm², and/or of around 240 mm², and/or may have a cross section not larger than 280 mm², preferably not larger than 260 mm², further preferred not larger than 250 mm².

According to an additional or alternative embodiment, electrical energy as generated by the generator having a voltage of 400 V to 1000 V is guided through the tower to an electrical power component, switches and/or to a transformer for being transformed to medium voltage (10-35 KV) by said components located at a lower position than the nacelle. In this case at least 9 cables, in at least particular 12, preferred 15 cables, and/or not more than 21 cables, in particular not more than 18 cables, preferred 15 cables are used for connecting the generator and/or power devices of the generator to a transformer being located in the tower below the generator or on the ground.

For example, a cable for such low voltage power transmission, in particular made from copper, may have a cross section of at least 200 mm², preferably at least 220 mm², further preferred at least 240 mm², and/or of around 270 mm², and/or may have a cross section not larger than 330 mm², preferably not larger than 310 mm², further preferred not larger than 300 mm².

With respect to one or both of the aforementioned embodiments, at least one or a plurality of cables for transmitting communication signals and/or support and/or auxiliary energy can be provided further with mentioned power cables.

Specifically, the nacelle can be rotated on the top of the tower about an essentially vertical axis (yaw axis). For this purpose a yaw system having at least one yaw drive mechanism is provided effectively between nacelle and the top of the tower. With the help of this yaw system a wind tracking of the nacelle is enabled. The nacelle may rotate such that the rotor of the wind turbine perpendicularly confronts the wind, which maximizes the energy generation of the wind turbine. This implies that the nacelle may rotate around the yaw axis according to the current wind direction. Hence, the rotation of the nacelle introduces a twist into the power cables, wherein said twist causes a deviation (shortening) in the length of the power cables.

Thus, during operation including rotation of the nacelle around the yaw axis, power cables may experience a twisting, which is acceptable at least in a certain range. In particular, a maximum twist angle may at least be +/−720° degrees (two entire rotations), preferably at least +/−900° degrees (three entire rotations), or at least +/−1440° (four rotations). Hence, the cables reaching from the nacelle to the electrical connection arrangement must be arranged, guided and configured to withstand such range of twisting without being subject to unwanted wear, structural damage and/or any further functional disadvantage caused by the twisting.

Furthermore, the tower comprises at least one radial cable guiding device for receiving the cable and a cable support arrangement for supporting the cable in a beneficial manner.

The radial cable guiding device is directly or indirectly supported by and mounted to the tower and is configured such that a space for movement of the power cables at least in a radial direction of the tower is limited, while a displacement of the power cables in an axial direction of the tower is allowed. Thus, the radial cable guiding device prevents cables from hanging and/or swinging freely within the tower, but provides displacement flexibility to the power cables in axial direction and/or in a longitudinal cable direction. According to an embodiment the radial cable guiding device can include a ring surrounding the cables, wherein the ring is directly or indirectly attached to the tower. Hence, the movement of the cables in radial direction is thereby limited by the inner diameter of the ring.

In particular, the effective inner diameter of the radial cable guiding device is at least 100% larger, in particular at least 60% larger, preferred at least 30% larger, than a maximum outer diameter of the power cables, in particular of a cable bundle formed by a plurality of power cables. For example, the effective inner diameter may have a size of at least 150 mm, preferably at least 170 mm, further preferred at least 190 mm, and/or of around 200 mm, and/or may have a cross section not larger than 250 mm, preferably not larger than 230 mm, further preferred not larger than 210 mm.

The cable support arrangement is mounted directly or indirectly to the tower at a lower level than the radial cable guiding device. In particular, the vertical cable support arrangement comprises cable support fixation means for firmly mounting at least a part of the power cables, in particular a part of a supported portion of the power cables to the cable support arrangement.

Furthermore, the tower comprises anti-torsion fixation means configured for reducing and/or preventing a propagation of a cable twist of the cables of a hanging portion into power cables of a loop portion.

In fact, the cable support arrangement and the anti-torsion fixation means are at least partially holding the power cables such and are arranged and configured such that the power cables form and comprise a hanging portion having a cable axis, a cable loop portion having a horizontal cable loop portion, and the supported portion being at least partially supported by the cable support arrangement.

The terms "horizontal cable loop" and "horizontal cable loop portion" are used interchangeably herein to represent a curved portion of the power cables, in particular of the cable loop portion, wherein said cables comprise a curvature that is less than a complete loop and at least partially extending in a horizontal plane.

In addition or in the alternative, cable support arrangement and the anti-torsion fixation means are at least partially holding the power cables such and are arranged and configured such that the power cables of the cable loop portion are positioned at least partially in a form similar to a spiral when seen in direction of the longitudinal axis of the tower.

In particular, the anti-torsion fixation means are not necessarily embodied as a specific physical apparatus, but can also be functionally represented by other parts, for example by the cable support arrangement and in particular by a specific location of cable support fixation means of the cable support arrangement holding the power cables in a specific way, and/or wherein the cables have a specific length.

The hanging portion is essentially extending from the nacelle or from a nacelle cable connection point at a lower portion of the nacelle to the cable loop portion of the power cables. The power cables of the hanging portion are hanging in an essentially straight and parallel manner, are mainly directed in axial and/or longitudinal direction of the tower and thereby defining the cable axis. Nevertheless, the power cables of the hanging portion may be subject to twisting if the nacelle is rotated around the yaw axis. The plurality of power cables may form a cable bundle.

According to an embodiment the hanging portion has a length in a vertical direction of at least 5 m, in particular of at least 7 m, preferred of at least 8 m, and/or around 9 m, and/or of not more than 50 m, in particular of not more than 20 m, preferred of not more than 15 m, more preferred not more than 12 m.

In particular, the power cables are configured to withstand a twist of at least 0.18 full rotations per meter cable length (n/m), in particular at least 0.2 n/m, preferred at least 0.25 n/m, and/or around 0.28 n/m, and/or not more than 0.4 n/m, in particular not more than 0.35 n/m, preferred not more than 0.3 n/m. For example, power cables having a hanging portion of about 9 m length are configured to accept a twist of 2.5 rotations in each rotational direction.

According to an embodiment, the cable loop portion comprises a vertical cable loop portion having a first curvature in radial direction and the horizontal cable loop portion having a second curvature in a circumferential direction.

By the first curvature in radial direction the power cables coming from the hanging portion are at least partially curved towards a radially outer area of the tower. Thus, the first curvature of the vertical cable loop portion is less than a complete loop and at least partially extends in the vertical plane. The terms "vertical cable loop" and "vertical cable loop portion" are used interchangeably herein.

By the second curvature in circumferential direction the power cables coming from the first curvature having a component in radial direction are at least partially curved to obtain an orientation component in circumferential direction, for example in direction of a tower wall of the tower. Hence, the second curvature has a curvature component lying in the horizontal plane, and is thereby forming the horizontal cable loop.

In particular, the cable loop portion has at least one bending radius while electrically connecting the hanging portion of the power cables to a supported portion of the power cables. The cable loop portion may be freely hanging between hanging portion and the cable support arrangement without being supported by any structure or device, in particular but being supported by the hanging portion and the supported portion. For example, one ending part of the cable loop portion is connected to, supported by and merging with the hanging portion of the power cables. The other ending part of the cable loop portion merges with the supported portion of the power cables and is thereby supported by the supported portion of the power cables and indirectly by the cable support arrangement.

According to an optional embodiment the effective cable length of the cable loop portion is at least 0.5 m, in particular of at least 1 m, preferred of at least 1.5 m, and/or around 2 m, and/or does not exceed 5 m, in particular of not more than 4 m, preferred of not more than 3 m.

It shall be mentioned, that the determination of a length of the hanging portion with respect to a determination of the effective length of the cable loop portion may be achieved by an iterative process, in particular by starting with certain initial values, performing an assessment of functionality of said values and optimizing said values, while using those optimized values as further starting values.

Preferably, the power cables forming the hanging portion, the cable loop portion and the supported portion are made from the same cables without structural intersections, connections or other irregularities between the single power cables.

The anti-torsion means can be embodied such that the cable support arrangement comprises cable support fixation means for firmly mounting at least a part of the supported portion to the cable support arrangement. The cable support fixation means are configured and located such, that the fixation effect of the power cables of the cable support arrangement, in particular with respect to cable twist or cable rotation, extends into and affects the entire cable loop portion. By this rotational fixation of the supported portion and of an ending part of the adjacent cable loop portion neighboring the supported portion a propagation, at least an essential propagation, of a cable twist from the hanging portion into the cable loop portion is prevented. Thus, a twist—introduced into the hanging portion by a rotation of the nacelle, in particular within ranges as aforementioned, —realizes essentially solely in the hanging portion and does not negatively affect the curve loop portion.

The present embodiment allows for the first time to implement a power connection between a power component in the nacelle and an electrical connection arrangement using power cables, wherein undesired wear of the cables caused by relative friction is avoided without using complex support structures as presented in previous wind turbines.

In particular, it is achieved to obtain a precise functional separation performed by the power cables: firstly, a twist of the power cables is essentially exclusively absorbed by the hanging portion. Secondly, the deviation in length of the power cables is essentially exclusively compensated by the cable loop portion.

For example, an effective length of the cable loop portion is determined such that a deviation in length, caused by a maximum allowable cable twist, of at least 1 cm, in particular of at least 5 cm, preferred of at least 10 cm, more preferred of at least 15 cm, can be compensated, in particular the cable portion without falling below the acceptable minimum bending radius.

Separating a twist of the hanging portion from the cable loop portion prevents effectively and efficiently that power cables of the cable loop portion are contacting each other and causing friction phenomenons between each other. Said friction has an even worse effect, if cables of the cable loop portion would be squeezed together by a twist while compensating the length deviation of the cables.

These specific embodiments are the result of long-term experiments and calculations, and thereby of a remarkable investment.

According to a specific form, a propagation of a cable twist from the hanging portion into the cable loop portion is essentially avoided by locating the cable support arrangement at a tower level such, and by determining a length of the power cables such that the cable loop portion is formed at least on a height level same as the supported portion, and/or that the cable loop portion is not arranged on a lower level as the supported portion and/or than the cable support arrangement.

In the alternative or in addition, the anti-torsion fixation means at least partially include cable support fixation means for firmly mounting at least a part of the supported portion to the cable support arrangement such, and further include the hanging portion being having a determined length such the cable loop portion having the vertical cable loop and the horizontal cable loop is formed. In this case the anti-torsion fixation means are not a specific device, but are functionally represented by the determined location of the cable support fixation means, by the stiffness, flexibility and length of the power cables.

Additionally or alternatively the anti-torsion fixation means are embodied as an anti-torsion fixation device and/or include an anti-torsion fixation device. Said anti-torsion fixation device is a physical apparatus, in particular and for example other than the cable support fixation means. The anti-torsion fixation device arranges the power cables directly or indirectly to the tower such that a rotation of the cables is inhibited, while a displacement of the power cables in an axial direction of the tower is allowed. Thus, the anti-torsion device fixes the power cables to the tower rotationally and in radial direction, but provides displacement flexibility in axial direction and/or in a longitudinal, cable direction. Thus, according to this embodiment, the term "anti-torsion fixation means configured for reducing and/or preventing a propagation of a cable twist of the cables of a hanging portion into power cables of a loop portion" can be replaced by the term "anti-torsion fixation device configured for arranging the cables to the tower such that a rotation of the cables about the cable axis is inhibited, while the cables at least partially of the hanging portion and at least partially of the cable loop portion may perform a movement in the axial direction".

Specifically, the anti-torsion fixation device is located at a transition and/or interface between the hanging portion and the cable loop portion, thus at an ending of the hanging portion and a beginning of the cable loop portion (when coming from the top of the wind turbine). By this, any twist of the power cables of the hanging portion introduced by a rotation of the nacelle is stopped at the anti-torsion fixation device and cannot propagate further into the cable loop portion.

According to an embodiment, A further embodiment is disclosed, wherein the cable support fixation means are arranged such and the power cables having a length such that a minimum bending radius of the bending radius is at least 0.2 m, in particular at least 0.3 m, preferred 0.4 m, and/or wherein a maximum bending radius is not larger than 1.1 m, in particular not larger than 0.9 m, preferred not larger than 0.8 m.

Accordingly, the size of the cable loop portion is determined such, that in actual bending radius is sufficiently larger than the minimum bending radius if there is no twist introduced into the power cables. This oversizing of the actual bending radius with respect to the minimum bending radius is chosen such that a deviation of an effective length of the hanging portion caused by a maximum cable twist can be compensated by the cable loop portion without the actual bending radius falling below the minimum bending radius.

According to a further embodiment, the anti-torsion fixation device comprises a cable fixation portion having fixation means for firmly mounting the cables to the cable fixation portion, a mounting portion for mounting the anti-torsion fixation device directly or indirectly to the tower, in particular to a central support structure of the tower, and an intermediate portion configured for holding the cable fixation portion to the mounting portion such that a rotation and/or a displacement of the cable fixation portion with respect to the mounting portion in radial direction is prevented and a displacement in axial direction and/or along the cable axis is enabled.

Specifically, the cable fixation portion may include a cable clamp and a base structure to which the cable clamp can be firmly fixed, for example by screws. Optionally, the base structure can be attached to the mounting portion via the intermediate portion as described, while the intermediate portion is firmly connected to the mounting portion. Intermediate portion and base structure may be embodied as a rail guiding system, wherein the intermediate portion may include certain holders embracing at least partially the base structure such that a rotation and/or a displacement of the base structure with respect to the intermediate portion and/or mounting portion in radial direction is prevented and a displacement in axial direction and/or along the cable axis is enabled.

Furthermore, the intermediate portion may include a roller system and/or linear roller bearings arranged effectively between the mounting portion and the cable fixation portion such, that translational movement of the cable fixation portion with respect to the mounting portion can be performed with reduced friction and wear with respect to an embodiment without said measure.

Additionally or in the alternative, means for providing a reduced coefficient of friction between friction components, in particular between the cable fixation portion and the mounting portion, can be provided. The reduction of the coefficient of friction is to be understood with respect to a coefficient of friction of the tribological combination steel on steel. In particular, means for reducing friction do not include providing grease or a liquid or pasty lubricant between the components. For example, the means are chosen such that a static friction coefficient (dry and clean) between the friction parties is less than 0.7, in particular less than 0.3, preferably less than 0.1.

According to an embodiment, the cable support fixation means of the cable support arrangement are positioned precisely such that an orientation of the power cables of the cable loop portion directly adjacent to the cable support fixation means, in the horizontal plane, is not pointing to the cable axis, and/or that a virtual straight line extending in the horizontal plane and defined by an orientation of the power cables of the cable loop portion directly adjacent to the cable support fixation means has a minimum distance to the cable axis of at least 0.1, in particular of at least 0.15, preferred of at least 0.2 of a respective tower radius. In particular, by providing the cable support fixation means in the specific way, the formation of the horizontal cable loop is supported in its form maintained.

According to an embodiment, the tower comprises a cable loop platform having a platform surface, wherein the cable loop platform at least partially acts as the cable support arrangement. In particular, the embodiment as a cable loop platform has two synergistic effects: power cables are supported and mounted in a preferred way while professional personnel may use the platform for mounting the cables.

Furthermore, the cable loop platform can only partially cover a cross-section of the tower, in particular the cable loop platform covers not more than 70%, in particular not more than 50%, preferred not more than 40%, more preferred not more than 30% of the size of a respective sectional area of the tower.

According to an alternative embodiment, cable loop platform can be a full platform, in particular, having necessary openings for cables, ladder, and/or an elevator.

According to another embodiment, the tower of the wind turbine comprises a central support structure. Said structure is arranged in the tower and is extending in the axial direction of the tower, wherein the radial cable guiding device and/or the anti-torsion fixation device is/are mounted to the central support structure.

Furthermore, a plurality of radial cable guiding devices is provided, wherein the radial cable guiding devices are mounted to the central support structure along the axial direction. By this, an improved guiding of the hanging portion of the power cables is achieved.

According to an embodiment, at least two of the radial cable guiding devices, preferred a majority thereof, more preferred all of the cable guiding devices, are mounted to the central support structure such, that the distance between the radial cable guiding devices amounts at least to 3 m, in particular at least to 4 m, preferred at least to 4.5 m, and/or does not exceed 7 m, in particular 6 m, preferred 5.5 m.

Furthermore, the electrical connection arrangement located in the tower or on a base of the tower comprises a power cable splice point. Said power cable splice point connects lower endings of the power cables with subsequent power conducting devices. In particular, if the electrical connection arrangement is positioned in the tower, the power cables are connecting the nacelle to the electrical connection arrangement, wherein from the subsequent electrical connection to subsequent electric devices is achieved by using subsequent power conducting devices embodied as aluminum conductors.

According to another aspect, a wind turbine having a tower according to one or a plurality of the precedingly described embodiments as disclosed, wherein a nacelle having a rotor is rotatably mounted on the top portion of the tower.

Embodiments as described shall represent various aspects of the disclosure, wherein additional combinations of said embodiments are explicitly included as long as such combinations make technically stands in the light of the skilled person, for example, a combination of functionally embodied anti-torsion means and at least an anti-torsion device is a suitable embodiment for improving the performance of the cable loop portion.

These and other features, aspects and advantages of the present disclosure will be further supported and described with reference to the following description and appended claims, in particular in paragraphs referring to FIG. 3 to FIG. 6. The accompanying drawings, which are incorporated in and constitute a part of this specification, illustrate embodiments of the disclosure and, together with the description, serve to explain the principles of the disclosure, wherein a limitation of the disclosure may not be construed by said shown embodiments, for example, further non-shown embodiments such as the embodiment having the electrical connection arrangement placed on a height level in the tower for ergonomically optimizing installation and maintaining task of professional personal as described in the following, but not shown, shall be included.

BRIEF DESCRIPTION OF THE DRAWINGS

A full and enabling disclosure, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION

Figure 1:
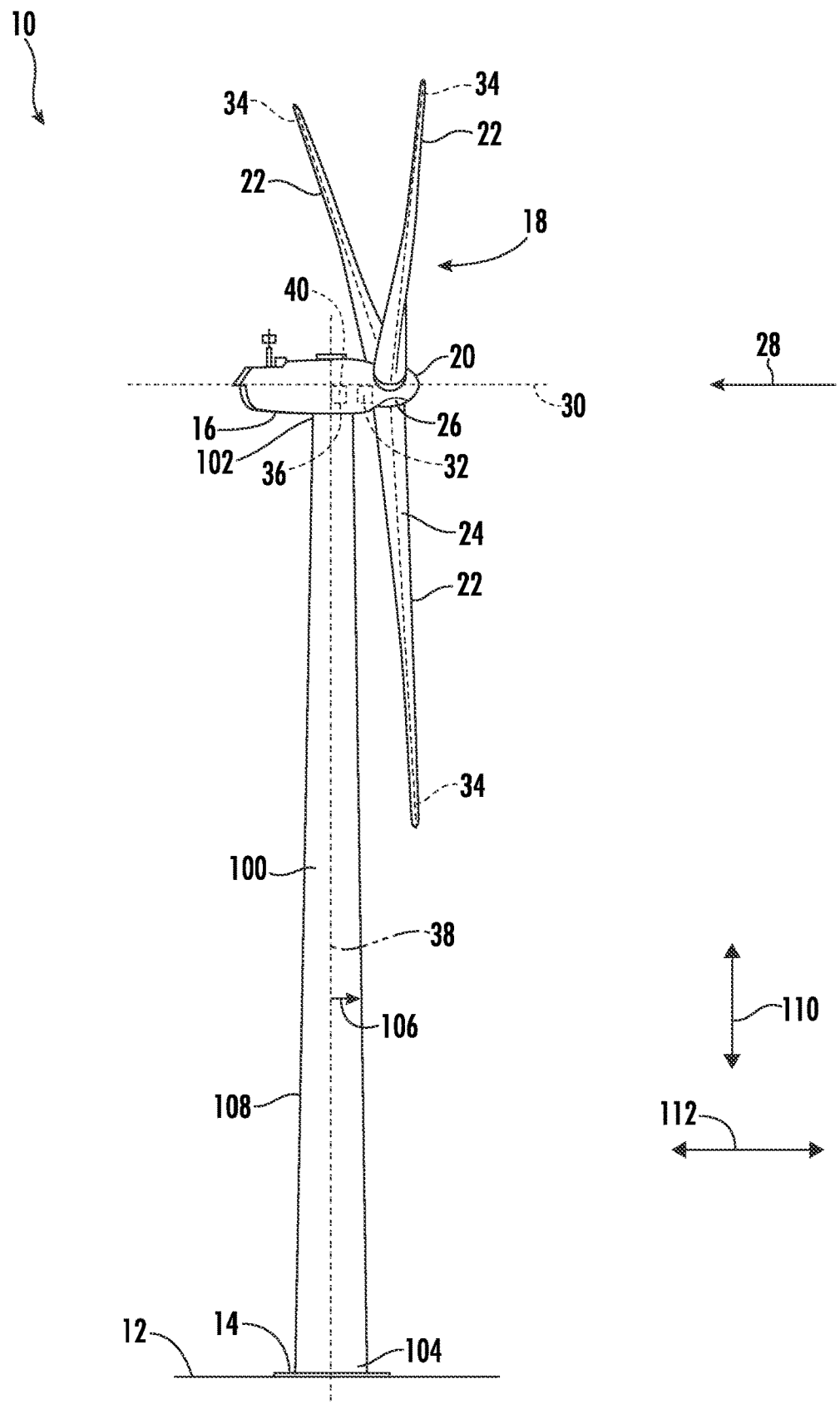
FIG. 1 illustrates a perspective view of one embodiment of a wind turbine according to the present disclosure.

Reference now will be made in detail to embodiments of the disclosure, one or more examples of which are illustrated in the drawings. Each example is provided by way of explanation of the disclosure, not limitation of the disclosure.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22. In the exemplary embodiment, the tower 100 is fabricated from tubular steel to define a cavity (not shown in FIG. 1) between a support system 14 and the nacelle 16. In an alternative embodiment, the tower 100 is any suitable type of a tower having any suitable height. According to an alternative or additional embodiment, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
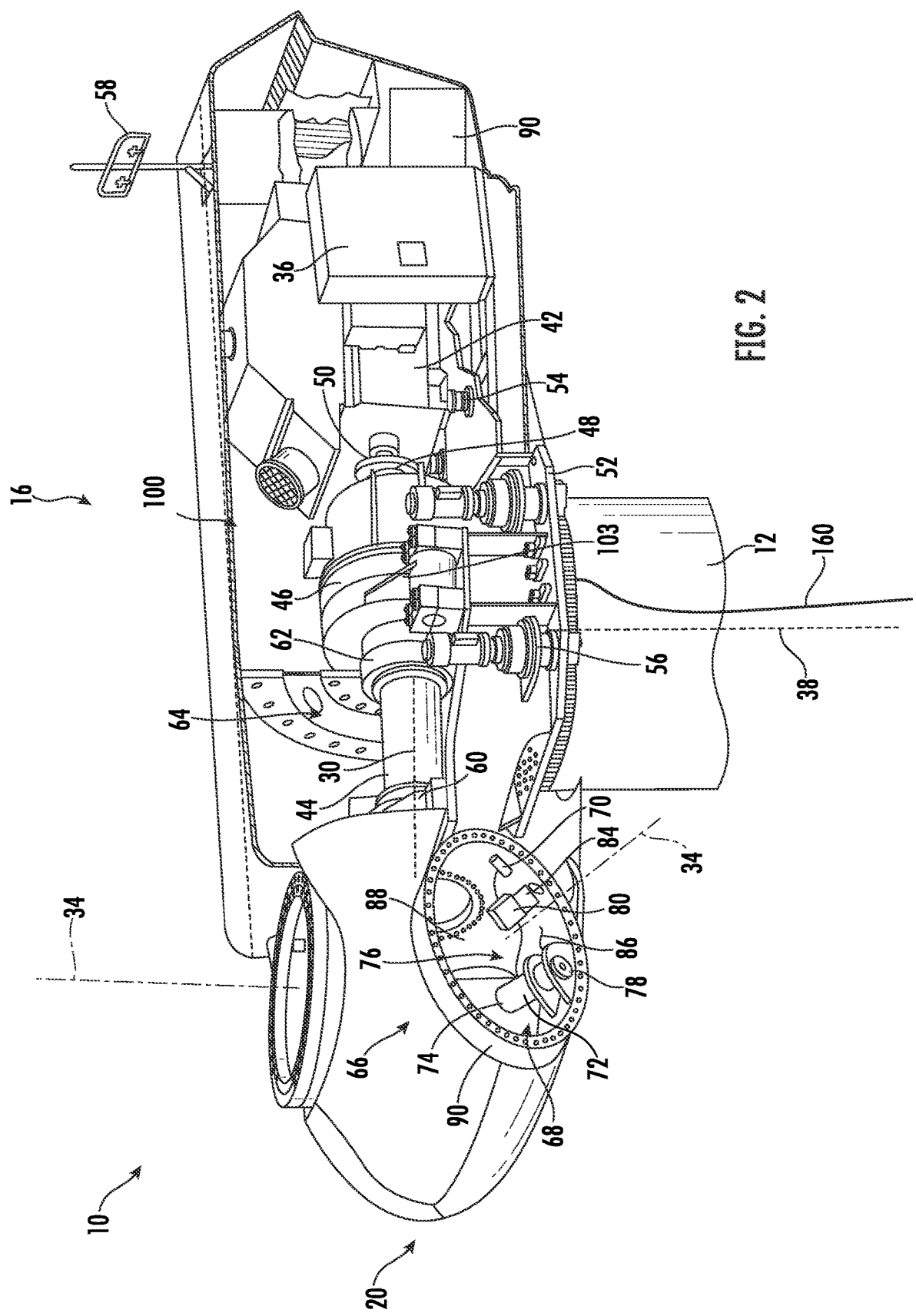
FIG. 2 illustrates a simplified, internal view of one embodiment of a nacelle of a wind turbine having a gearbox system according to the present disclosure.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50. Furthermore, a transformer 90 and/or a suitable electronics, switches, and/or inverters are arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction 28 and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3:
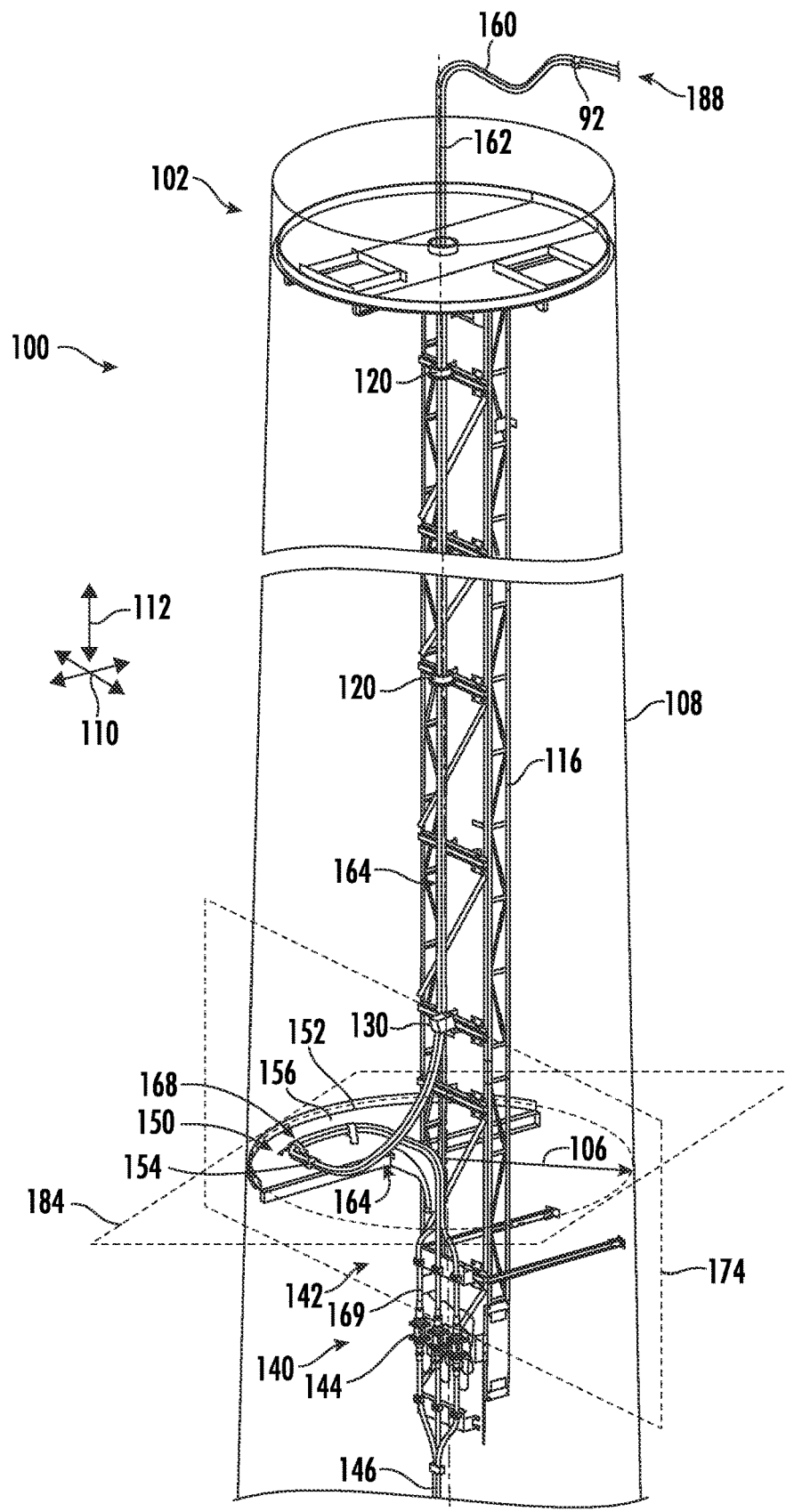
FIG. 3 represents a partially schematic sectional view through the tower of the wind turbine according to a first embodiment as shown in FIG. 1.

FIG. 3 shows a partial, sectional view on a first embodiment of a tower 100 of a wind turbine 10. Also, FIG. 4 and FIG. 5 display certain aspects of the first embodiment of the tower 100. The tower 100 has a top end 102 suitable for supporting the nacelle 16. Electrical energy generated by the generator 42 and transformed by the transformer 90 is conducted via the power cables 160 from the nacelle 16 in the tower 100, wherein a nacelle connection portion 188 of the power cables 160 is firmly arranged in the nacelle 16, for example with the help of nacelle cable fixation means 92.

The power cables 160 are leading towards the yaw axis 38 and/or to a cable axis 162 mainly being aligned with a longitudinal axis of the tower 100. At this central location, the power cables 160 are led into the tower 100, in particular in axial direction 112 of the tower 100. From there the power cables 160 are freely hanging into the tower 100 in axial direction and are preferably supported by a support arrangement in the nacelle 16.

Power cables 160 hanging in the tower 100 can be understood as a hanging portion 164 of the power cables 160. Specifically, a plurality of radial cable guiding devices 120 having a ring 122 or a roundish holding device are provided in the center of the tower 100 such that the cable axis 162 lies within the ring 122. Therefore, the power cables 160 of the hanging portion 164 are surrounded by the cable guiding devices 120 such that a space for movement of the power cables 160 is limited in radial direction 110 of the tower 100, while a displacement of the power cables 160 in axial direction 112 of the tower 100 is possible.

At the lower end of the hanging portion 164 the power cables 160 merge into a cable loop portion 166, which then is followed by a supported portion 168 of the power cables 160. Hence, the power cables 160 in the tower 100 may be understood as having a hanging portion 164, a cable loop portion 166 and a supported portion 168.

The supported portion 168 is supported by a cable support arrangement 150, which—according to the present embodiment—is embodied as a partial support platform 152 being arranged at least partially horizontally in the tower 100.

Figure 4:
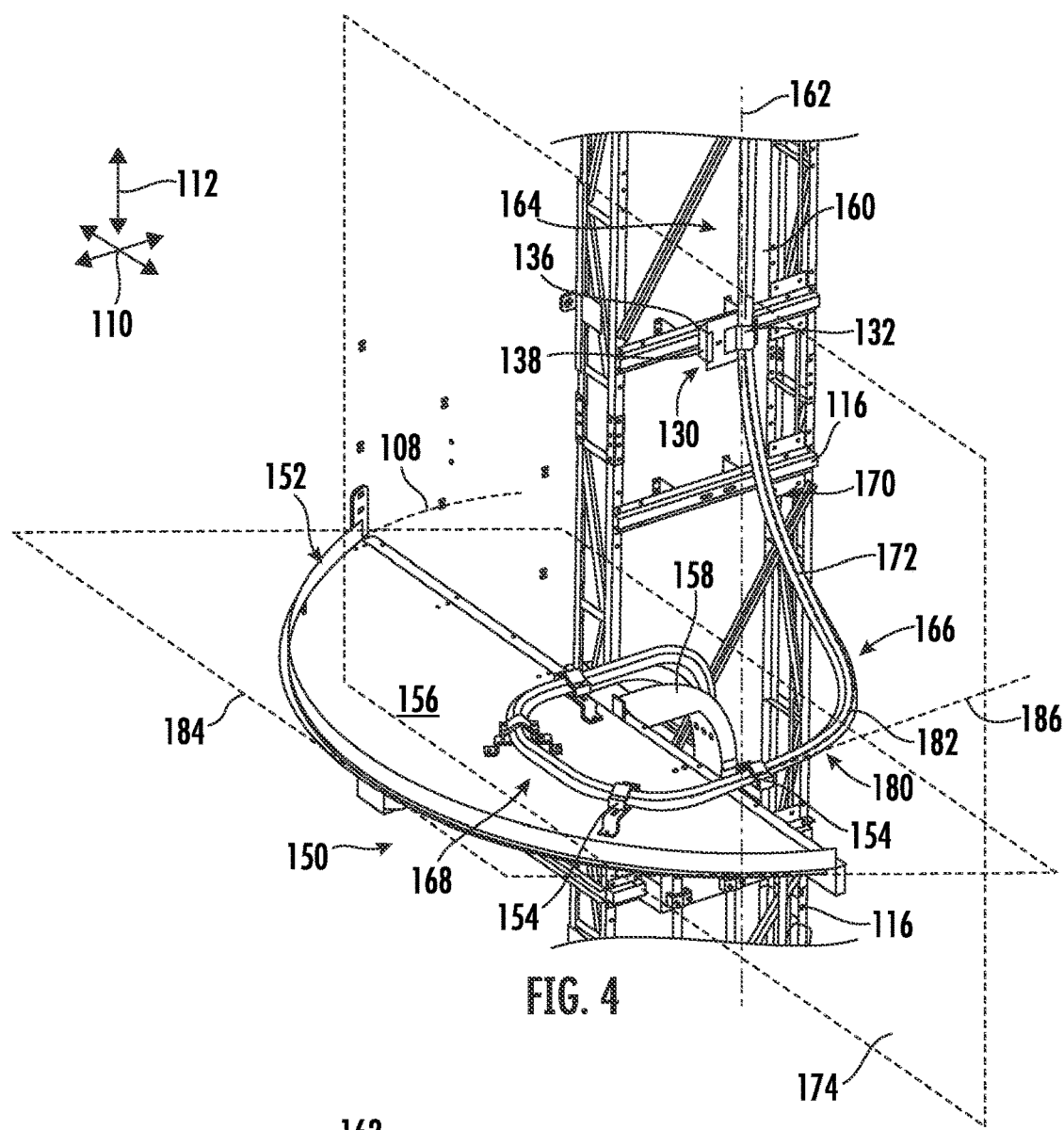
FIG. 4 represents shows a partially schematic view in a tower of the wind turbine according to the first embodiment of FIG. 3.

According to all embodiments, the power cables 160 of the cable loop portion 166 may have at least a vertical cable loop 170 with a first curvature 172 and a horizontal cable loop 180 with a second curvature 182. The first curvature 172 has a curvature component lying in a vertical plane 174 such that the power cables 160 lead from a central area of the tower 100 at least partially in radial direction 110 towards the tower wall 108, as depicted in FIG. 3, FIG. 4 in FIG. 6. In addition, the horizontal cable loop 180 having the curvature 182 causes an orientation of the power cables 160 of the cable loop portion 166 towards a circumferential direction towards cable support fixation means 154 of the cable support arrangement 150.

The configuration as described result in the power cables 160 of the cable loop portion 166 are positioned at least partially in a form similar to a spiral when seen in direction of the longitudinal axis of the tower 100.

The power cables 160 are firmly attached to the cable support arrangement 150 with the help of cable support fixation means 154. Said fixation of the power cables 160 in a radial outer area of the tower 100 is embodied such, that a virtual line 186 starting at the cable support fixation means 154 adjacent to the cable loop portion 166 does not lead through the cable axis 162 or the tower axis, nor through a central area of the tower 100. In particular, the virtual straight line 186 extending in the horizontal plane 184 defined by the orientation of the cables 160 of the cable loop portion 166 directly adjacent to the cable support fixation means 154 has a minimum distance to the cable axis 162 of at least 0.1, in particular of at least 0.15, preferred of at least 0.2 of a respective tower radius 106.

Figure 6:
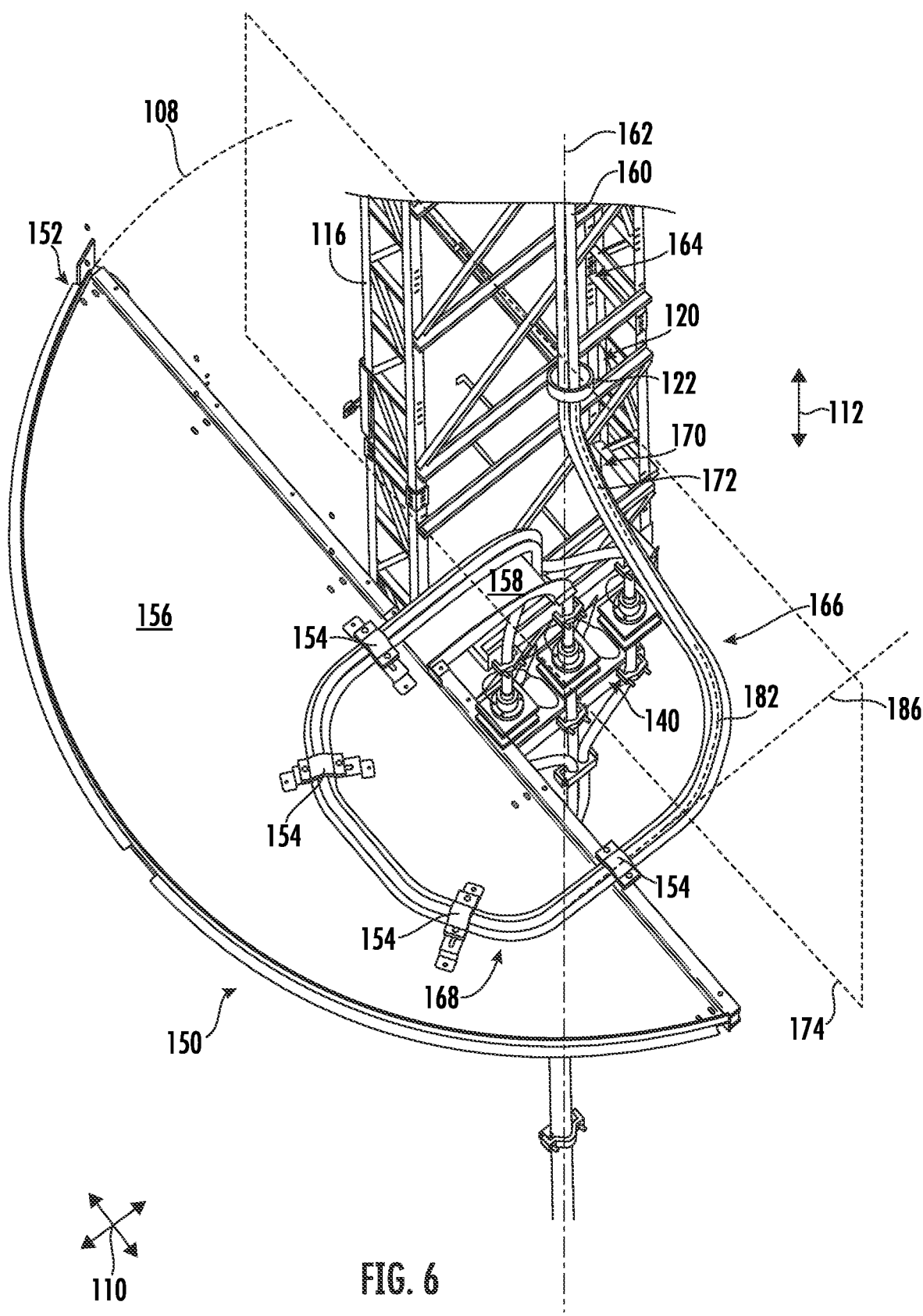
FIG. 6 shows a partially schematic view in a tower of the wind turbine according to a second embodiment.

The combination of a vertical cable loop 170 and a horizontal cable loop 180 leads to a beneficial formation of the cable loop portion 166, which inhibits a propagation of a twist of the hanging portion 164 into the cable loop portion 166. The example shown in FIG. 6 provides a solution, wherein the anti-torsion fixation means are at least partially functionally represented by the specific fixation of the power cables 160 on the cable support arrangement 150, and by the determination of a specific length of the power cables 160 such, that the cable loop portion 166 having the vertical cable loop 170 and a horizontal cable loop 180 are materializing. Possibly, the transition between the hanging portion 164 and the cable loop portion 166 may be manifested by providing a radial cable guiding device 120 as shown in FIG. 6 at this transition.

Figure 5:
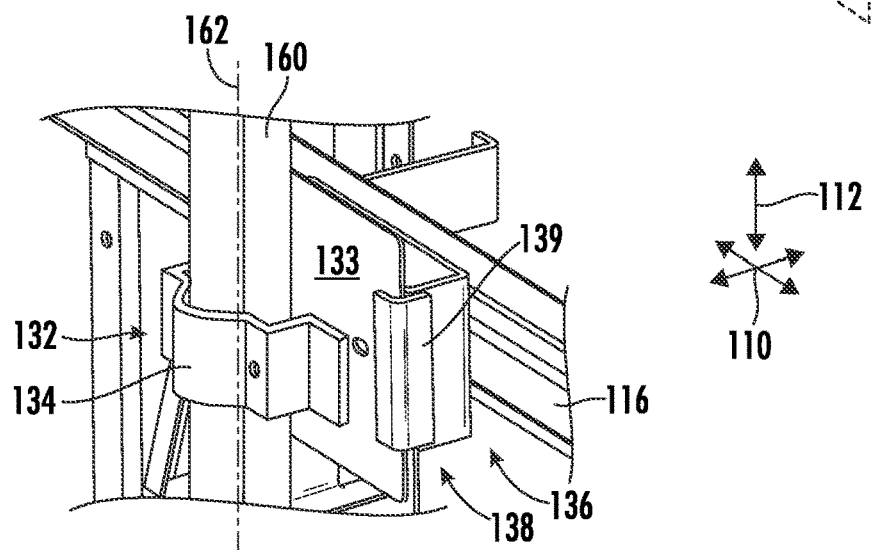
FIG. 5 displays a sectional view on an anti-torsion device of the first embodiment of FIG. 3.

Nevertheless, embodiments as shown in FIG. 3, FIG. 4 and FIG. 5 include to embody the anti-torsion fixation means as an anti-torsion fixation device 130. Thus, the hanging portion 164 and the cable loop portion 166 can be differentiated from each other by the anti-torsion fixation device 130 placed between both portions. Nevertheless, the special provision of the cable loop portion 166 having a vertical cable loop 170 and a horizontal cable loop 180 as described supra is still in applicable option.

The anti-torsion fixation device 130 has the effect that any twist introduced into the cables 160 by a rotation of the nacelle 16 remains in the hanging portion 164 and cannot propagate beyond the anti-torsion device 130 into the cable loop portion 166. The anti-torsion device 130 as indicated in FIG. 3 and FIG. 4 shall the embodied according to the detailed FIG. 5.

The anti-torsion device 130 is mounted to the tower 100 via the central support structure 116 and may replace a radial cable guiding device 120 located the closest to the cable support arrangement 150 as shown in FIG. 6.

The anti-torsion device 130 may comprises a cable fixation portion 132 for fixing the power cables 160 to a fixation plate 133 using cable fixation means 134. Thus, the cable fixation portion 132 is firmly connected to the power cables 160. Furthermore, the cable fixation portion 132 is connected to the mounting portion 136 by the intermediate portion 138 such that a rotation about the cable axis 162 and/or a displacement of the cable fixation portion 134 with respect to the mounting portion 136 in radial direction 110 is prevented and a displacement in axial direction 112 and/or along the cable axis 162 is enabled.

For example, the power cables 160 may be attached to a fixation plate 133 by the help of fixation means 134 in form of a bracket. Optionally or alternatively, the intermediate portion 138 may comprise a clamp 139 which holds the fixation plate 133 in radial direction 110 and prevents a rotation of the power cable 160 together with the cable fixation portion 132.

The embodiments according to FIG. 3 to FIG. 6 all include that the electrical connection arrangement 140 which is placed under the cable support arrangement 150. Nevertheless, it is disclosed, but not shown, to located electrical connection arrangement is in the tower such, that the electrical connection arrangement 140 is located at a proper ergonomically installation and working height of professional personal standing on the support platform 152. For such purpose, power cables 160 after the supported portion following the supported portion may be guided upwards again to an electrical connection arrangement 140 being arranged in a proper working height of professional personal.

In fact, it will be apparent to those skilled in the art that various modifications and variations can be made in the present invention without departing from the scope or spirit of the invention, for instance, features illustrated or described as part of one embodiment can be used with another embodiment to yield a still further embodiment, for example, by combining the first embodiment having the anti-torsion device 130 of FIGS. 3 to 5 with the embodiment having anti-torsion means of FIG. 6, thus, it is intended that the present invention covers such modifications and variations as come within the scope of the appended claims and their equivalents.

REFERENCE NUMBERS 10 wind turbine
12 ground
14 support system
16 nacelle
18 rotor
20 rotatable hub
22 rotor blades
24 blade root portion
26 load transfer regions
28 wind direction
30 rotor axis
32 pitch system
34 pitch axes
36 wind turbine controller
38 yaw axis
40 processor
42 electric generator
44 main shaft
46 gearbox
48 high speed shaft
50 coupling
52 main frame
54 decoupling support means
56 yaw drive mechanism
58 meteorological mast
60 forward support bearing
62 aft support bearing
64 drive train
66 pitch assembly
68 pitch drive system
70 sensor
72 pitch bearing
74 pitch drive motor
76 pitch drive gearbox
78 pitch drive pinion
80 pitch control system
84 power generator
86 cavity
88 inner surface
90 transformer
92 nacelle cable fixation means
100 tower
102 top end
104 support end
106 tower radius
108 tower wall
110 radial direction
112 axial direction
116 central support structure
120 radial cable guiding device
122 ring
130 anti-torsion fixation device
132 cable fixation portion
133 fixation plate
134 cable fixation means
136 mounting portion
138 intermediate portion
139 clamp
140 electric connection arrangement
142 cable splice point
144 connectors
146 subsequent power conducting device
150 cable support arrangement
152 support platform
154 cable support fixation means
156 platform surface
158 support saddle
160 power cable
162 cable axis
164 hanging portion
166 cable loop portion
168 supported portion
169 lower cable end
170 vertical cable loop
172 first curvature
174 vertical plane
180 horizontal cable loop
182 second curvature
184 horizontal plane
186 virtual line
188 nacelle connection portion

The invention claimed is:

1. A tower for a wind turbine, the tower comprising
a top end configured to rotatably support a nacelle about a yaw axis of the wind turbine, wherein the nacelle includes a generator;
a support end configured to support the wind turbine on a ground support system;
a plurality of power cables for electrically connecting the generator to an electric connection arrangement mounted to the tower;
a cable guiding device mounted to the tower and attaching the power cables to the tower, the cable guiding device allowing displacement of the power cables in an axial direction of the tower and limiting movement of the power cables in a radial direction in the tower;
a cable support arrangement mounted to the tower at a level, relative to a base of the tower, that is lower than a level of the cable guiding device;
the power cables arranged in the tower to have a hanging portion having a cable axis, the hanging portion merging into a cable loop portion, and the cable loop portion merging into a supported portion at least partially supported in a horizontal plane by the cable support arrangement;
means for minimizing propagation of torsion and cable twist, wherein the torsion and cable twist is generated in the hanging portion and propagates into the cable loop portion;
the cable loop portion comprising a first vertical cable loop portion with a first curvature in a vertical plane to direct the power cables radially outward from the cable axis of the hanging portion, and a horizontal cable loop portion extending at least partially in the horizontal plane and having a second curvature that directs the cables at a transverse angle away from the vertical plane of the first vertical cable loop portion to the horizontal plane of the supported portion;
the cable support arrangement comprising a platform that supports the supported portion of the power cables; and
one or more cable support fixation devices that mount the supported portion in the horizontal plane to the platform.

2. The tower according to claim 1, wherein the level of the cable support arrangement is such that the cable loop portion extends at least on a same height level as the supported portion and the transverse angle is an essentially perpendicular angle.

3. The tower according to claim 1, wherein the means for minimizing propagation of torsion and cable twist comprises one or a combination of:
a predetermined length of the hanging portion to enable formation of the vertical cable loop portion and the horizonal cable loop portion in the cable loop portion; and
an anti-torsion fixation device that mounts the power cables to the tower at a height above the cable support arrangement such that a rotation of the power cables about the cable axis is inhibited while at least partial movement of the hanging portion along the cable axis is permitted.

4. The tower according to claim 3, wherein the cable support fixation devices are arranged such that the cable loop portion has a minimum bending radius of at least 0.2 m when at least one of the power cables has a cross section of at least 55 mm$^2$ and at least one of the power cables has a cross section not larger than 110 mm$^2$.

5. The tower according to claim 4, wherein a size of the cable loop portion is such that a deviation of an effective length of the hanging portion caused by the cable twist is compensated by the cable loop portion.

6. The tower according to claim 1, wherein the cable support fixation devices mount the supported portion to the platform such that a virtual straight line extending from an orientation of the power cables of the cable loop portion directly adjacent to the cable support fixation devices in the horizontal plane does not point to the cable axis and the virtual straight line has a minimum distance to the cable axis of 0.1 of a radius of the tower.

7. The tower according to claim 1, wherein the platform is located at a platform height within the tower and the platform covers not more than 70% of a cross-section area of the tower at the platform height.

8. The tower according to claim 1, further comprising a central support structure arranged along and extending in the axial direction of the tower, the cable guiding device mounted to the central support structure.

9. The tower according to claim 8, comprising a plurality of the cable guiding devices mounted to the central support structure along the axial direction.

10. The tower according to claim 9, wherein at least two of the cable guiding devices are mounted to the central support structure with a distance therebetween equal to at least 3 m and not exceeding 7 m.

11. The tower according to claim 8, wherein the means for minimizing propagation of torsion and cable twist comprises an anti-torsion fixation device that mounts the power cables to the tower at a height above the cable support arrangement, the anti-torsion fixation device comprising:
a fixation portion, the power cables mounted to the fixation portion;
a mounting portion mounted to the central support structure; and
an intermediate portion that holds the fixation portion to the mounting portion in a manner such that rotation of the fixation portion with respect to the mounting portion in the radial direction is prevented and displacement in the axial direction is enabled.

12. A wind turbine, comprising the tower in accordance with claim 1, the wind turbine further comprising:
a rotor having at least one rotor blade, the rotor rotatably supported by the nacelle;
wherein the nacelle is rotatably mounted about the yaw axis of the wind turbine on the top end of the tower.

* * * * *